(12) United States Patent
Chen et al.

(10) Patent No.: US 10,791,832 B2
(45) Date of Patent: Oct. 6, 2020

(54) COUPLING MECHANISM AND SLIDE RAIL ASSEMBLY WITH CUSHIONING FUNCTION

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shih-Lung Huang, Kaohsiung (TW); Fang-Cheng Su, Kaohsiung (TW); Ci-Bin Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 15/809,156

(22) Filed: Nov. 10, 2017

(65) Prior Publication Data
US 2018/0255925 A1 Sep. 13, 2018

(30) Foreign Application Priority Data

Mar. 7, 2017 (TW) .............................. 106107481 A

(51) Int. Cl.
A47B 88/423 (2017.01)
A47B 88/407 (2017.01)
A47B 88/427 (2017.01)
A47B 88/956 (2017.01)
A47B 88/49 (2017.01)
A47B 88/483 (2017.01)
F16C 29/00 (2006.01)

(52) U.S. Cl.
CPC .......... A47B 88/423 (2017.01); A47B 88/407 (2017.01); A47B 88/427 (2017.01); A47B 88/483 (2017.01); A47B 88/49 (2017.01); A47B 88/956 (2017.01); F16C 29/005 (2013.01); A47B 2210/0056 (2013.01); A47B 2210/091 (2013.01); F16C 2314/72 (2013.01)

(58) Field of Classification Search
CPC ....... A47B 88/40; A47B 88/49; A47B 88/407; A47B 88/423; A47B 88/427; A47B 88/483; A47B 88/956; F16C 29/005
USPC ......... 312/330.1, 334.1, 334.4, 334.5, 334.6, 312/333
See application file for complete search history.

(56) References Cited

U.S. PATENT DOCUMENTS

| 7,121,638 | B1 * | 10/2006 | Eggert | B25H 3/028 312/332.1 |
| 7,695,080 | B2 * | 4/2010 | Chen | A47B 88/427 312/333 |
| 8,424,984 | B2 | 4/2013 | Ritter | |
| 8,585,165 | B2 * | 11/2013 | Liang | A47B 88/427 312/334.4 |
| 8,727,460 | B2 * | 5/2014 | Grabher | E05F 5/02 312/333 |

(Continued)

Primary Examiner — James O Hansen
(74) Attorney, Agent, or Firm — Rosenberg, Klein & Lee

(57) ABSTRACT

A coupling mechanism adapted for a furniture part and a slide rail includes a coupling base and a cushioning structure. The coupling base is detachably mounted on and in direct contact with the slide rail. The cushioning structure is in indirect contact with the slide rail and is configured to compensate for a possible gap between the furniture part and the slide rail.

9 Claims, 14 Drawing Sheets

(56) References Cited

U.S. PATENT DOCUMENTS

| | | | |
|---|---|---|---|
| 8,764,136 B2 * | 7/2014 | Grabherr | A47B 88/427 |
| | | | 312/334.27 |
| 8,854,769 B1 | 10/2014 | Liang et al. | |
| 8,979,223 B2 * | 3/2015 | Huang | A47B 88/427 |
| | | | 312/334.4 |
| 9,259,087 B1 * | 2/2016 | Hsiao | A47B 88/956 |
| 9,445,671 B2 * | 9/2016 | Ng | E05B 65/46 |
| 2012/0292465 A1 * | 11/2012 | Holzer | A47B 88/427 |
| | | | 248/201 |

* cited by examiner

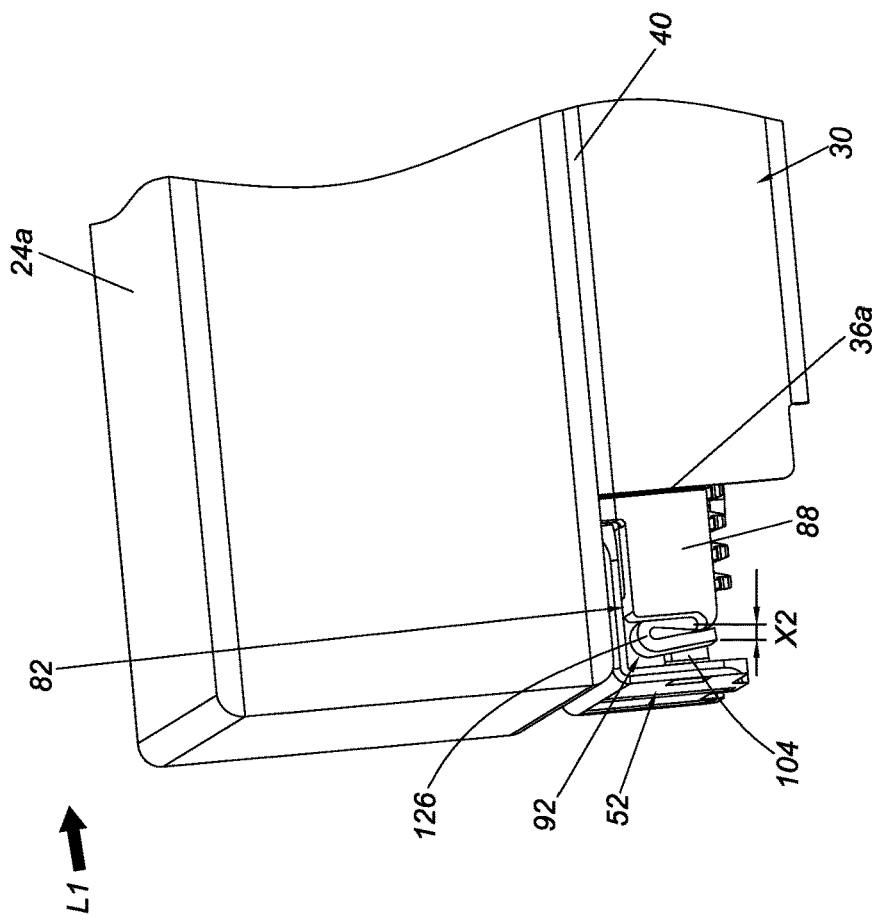
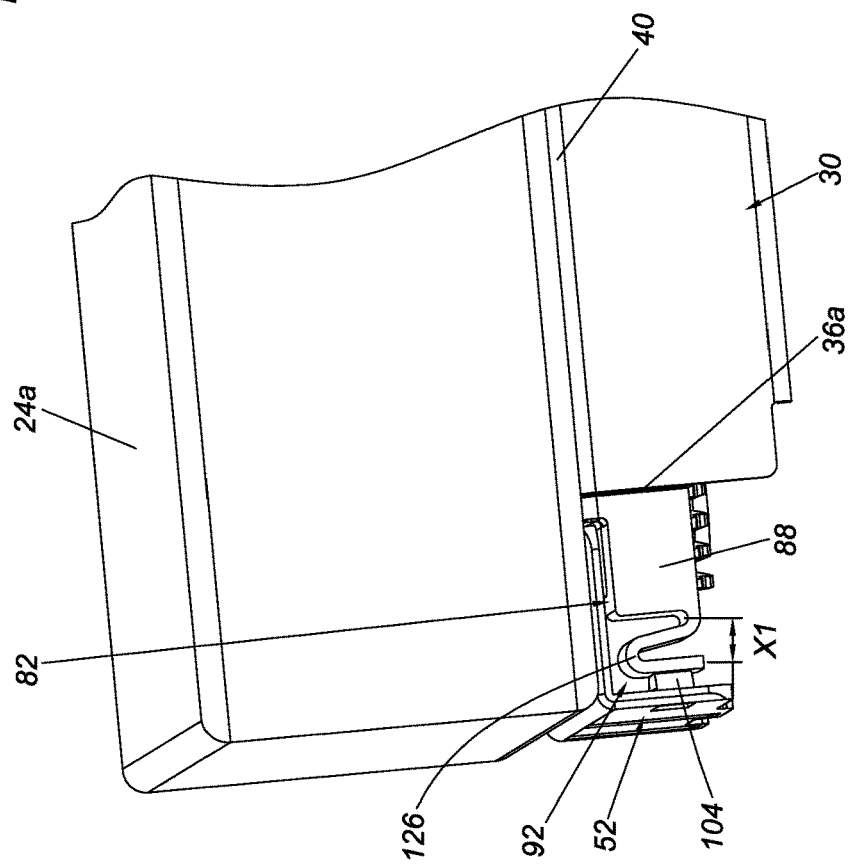

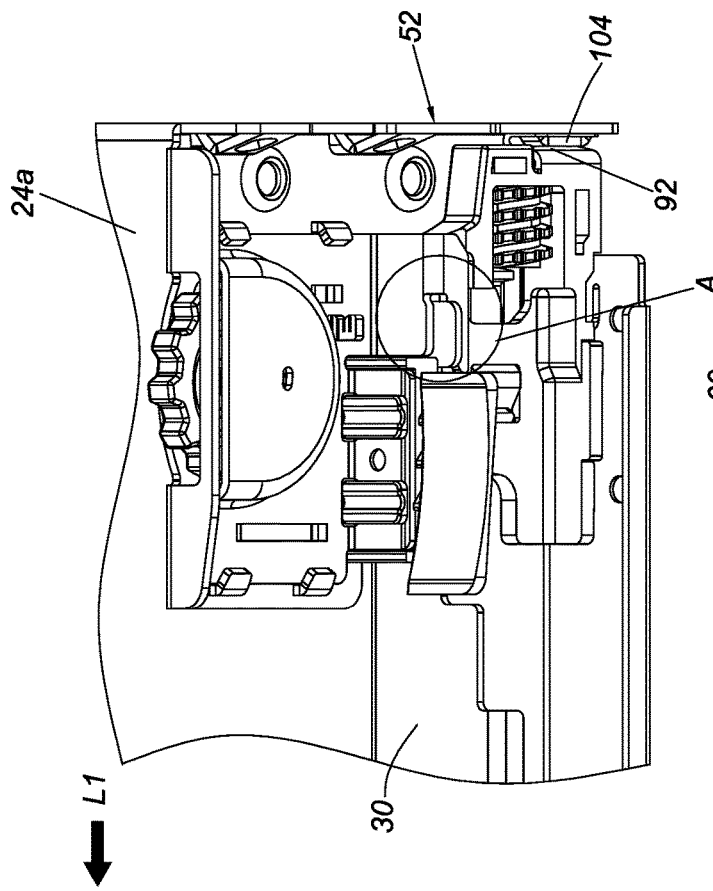
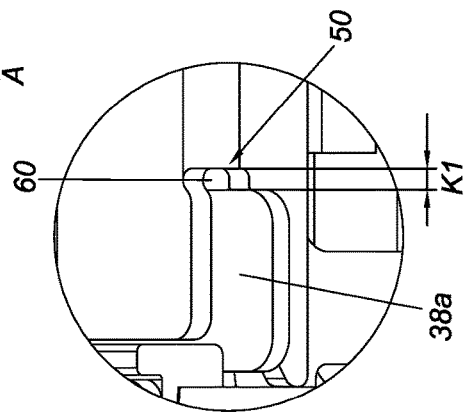
FIG. 19
FIG. 20
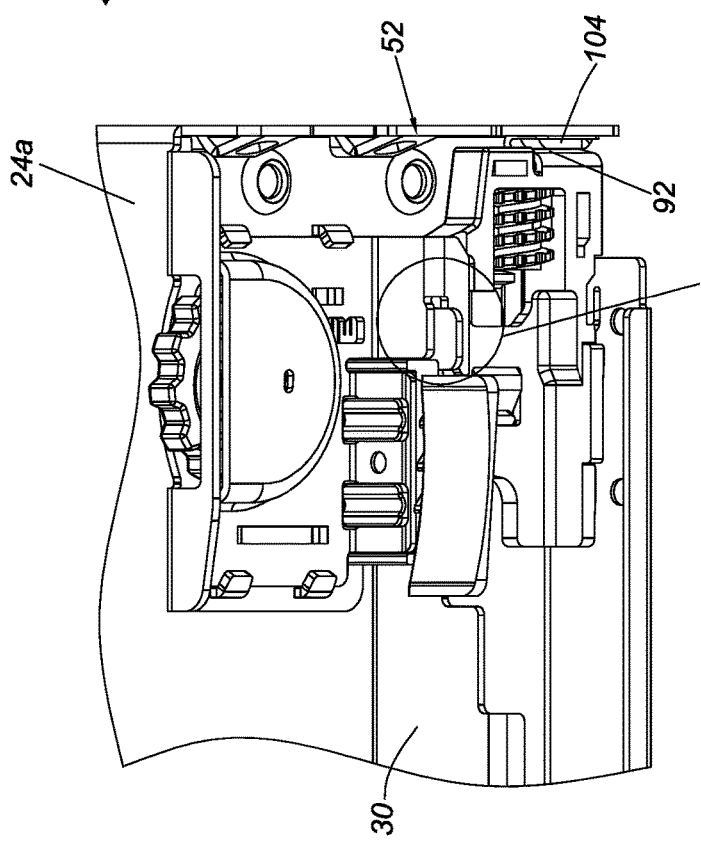
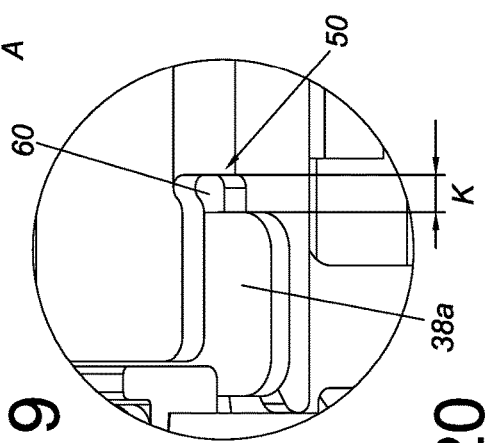
FIG. 21
FIG. 22

COUPLING MECHANISM AND SLIDE RAIL ASSEMBLY WITH CUSHIONING FUNCTION

FIELD OF THE INVENTION

The present invention relates to a mechanism and a slide rail. More particularly, the present invention relates to a coupling mechanism and a slide rail assembly with a cushioning function.

BACKGROUND OF THE INVENTION

Generally, an undermount drawer slide rail assembly is mounted on the bottom of a drawer and is therefore hidden from view. An undermount drawer slide rail assembly typically includes a first rail and a second rail displaceable with respect to the first rail. More specifically, the first rail is mounted on the body of a cabinet, and the second rail is configured to carry or support a drawer so that the drawer can be easily pulled out of and pushed back into the cabinet body through the second rail with respect to the first rail. The undermount drawer slide rail assembly stays hidden at the bottom of the drawer even when the drawer is pulled out of the cabinet body.

U.S. Pat. No. 8,424,984 B2 discloses an apparatus for releasably coupling a drawer to a drawer pull-out guide. According to the disclosure of this patent, which is incorporated herein by reference, an abutment (11) of the apparatus (7) is in contact with the counterpart holding portion (13) of a rail (5) by way of a resiliently yielding region (12) when a drawer is in a mounting condition, wherein the yielding region (12) acts as a cushion—in fact, the cushioning effect cannot be achieved without this additional tiny component. Should this component get lost, the cushioning effect will, too.

SUMMARY OF THE INVENTION

The present invention relates to a coupling mechanism and a slide rail assembly with a cushioning function.

According to one aspect of the present invention, a slide rail assembly includes a first rail, a second rail, and a coupling mechanism. The second rail can be longitudinally displaced with respect to the first rail. The coupling mechanism is adjacent to the second rail and includes a coupling base and a cushioning structure. The coupling base is mounted on and in direct contact with the second rail. The cushioning structure is in indirect contact with the second rail.

Preferably, the cushioning structure is in indirect contact with the second rail through the coupling base.

Preferably, the slide rail is longitudinally arranged, and the cushioning structure has a predetermined longitudinal length.

Preferably, the cushioning structure includes at least one winding contour.

Preferably, the cushioning structure is arranged at the coupling base.

Preferably, the coupling base is detachably fixed to and in direct contact with the slide rail.

Preferably, the coupling mechanism further includes a supporting member and a height adjustment member. The supporting member includes a supporting portion.

The height adjustment member is configured for displacing and thereby adjusting the supporting member with respect to the coupling base in order to change a height of the supporting portion of the supporting member with respect to the slide rail through a guiding feature.

Preferably, the slide rail has a front portion and a rear portion, the coupling base is mounted on the slide rail at a position adjacent to the front portion of the slide rail, and the guiding feature includes one of an inclined surface and a curved surface.

Preferably, the height adjustment member is rotatably mounted on the coupling base, and the height adjustment member and the supporting member have corresponding threaded structures.

Preferably, the coupling mechanism further includes a first base, a second base, a lateral adjustment member, and a transmission structure. The first base is detachably engaged with the coupling base and is thereby attached to the slide rail. The second base is displaceable with respect to the first base. The lateral adjustment member is rotatably mounted on one of the first base and the second base and is configured for laterally displacing and thereby adjusting the second base with respect to the slide rail. The transmission structure is located at one of the first base and the second base and is configured for converting a rotary movement of the lateral adjustment member into a linear displacement of the second base with respect to the first base.

Preferably, the coupling base includes an elastic portion, and the first base includes an engaging structure. The elastic portion has at least one first engaging section while the engaging structure has at least one second engaging section corresponding to the first engaging section. The elastic portion of the coupling base is detachably engaged with the engaging structure of the first base.

Preferably, the first base includes a first feature, and the second base includes a second feature. One of the first feature and the second feature includes at least one projection. The other of the first feature and the second feature includes at least one receiving space for receiving the at least one projection. The at least one receiving space is larger than the at least one projection so that, with the first feature and the second feature working with each other, the second base can be displaced within a limited range with respect to the first base.

Preferably, the lateral adjustment member is rotatably mounted on the second base and includes an adjusting portion, the transmission structure is located at the first base, and the transmission structure and the adjusting portion are configured to work with each other.

Preferably, the adjusting portion is a generally spiral guide groove, and the transmission structure is a projection located in the guide groove.

In one embodiment, the coupling mechanism is further adapted for a furniture part. The cushioning structure is in indirect contact with the slide rail and is configured for compensating for a possible longitudinal gap between the furniture part and the slide rail.

Preferably, the supporting portion of the supporting member is configured for facing the furniture part, and the height of the furniture part with respect to the slide rail is changeable through the guiding feature when the height adjustment member displaces and thereby adjusts the supporting member with respect to the coupling base.

Preferably, the second base is fixedly connected to the furniture part, and the lateral position of the furniture part with respect to the slide rail is changeable when the lateral adjustment member displaces and thereby adjusts the second base with respect to the first base.

According to another aspect of the present invention, a slide rail assembly includes a first rail, a second rail, and a coupling mechanism. The second rail can be longitudinally displaced with respect to the first rail. The coupling mechanism is adjacent to the second rail and includes a coupling base and a cushioning structure. The coupling base is mounted on and in direct contact with the second rail. The cushioning structure is in indirect contact with the second rail through the coupling base.

BRIEF DESCRIPTION OF THE DRAWINGS

FIG. 17 shows the second furniture part being mounted to the slide rail in an embodiment of the present invention, with the cushioning structure of the coupling mechanism not yet being compressed;

FIG. 18 shows the second furniture part being mounted to the slide rail in an embodiment of the present invention, with the cushioning structure of the coupling mechanism being compressed;

FIG. 19 is a bottom view showing the second furniture part being mounted on the slide rail in an embodiment of the present invention, with a longitudinal gap between the second furniture part and the slide rail;

FIG. 20 is an enlarged view of the circled area A in FIG. 19;

FIG. 21 is a bottom view showing the second furniture part being displaced in a first longitudinal direction with respect to the slide rail; and FIG. 22 is an enlarged view of the circled area A in FIG. 21.

DETAILED DESCRIPTION OF THE INVENTION

Figure 1:
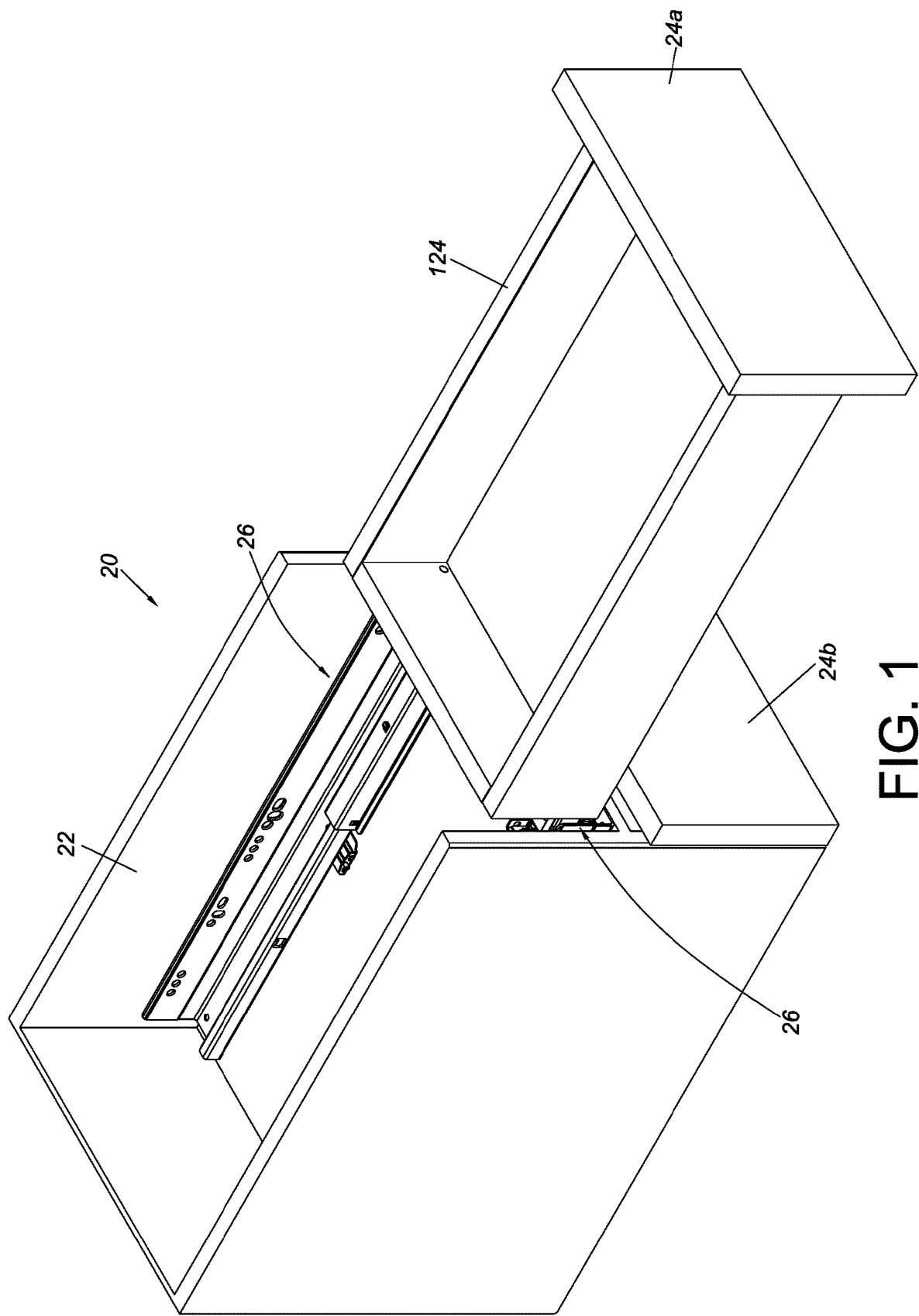
FIG. 1 is a perspective view of a piece of furniture to which an embodiment of the present invention is applied, wherein the furniture includes a first furniture part and two second furniture parts, and wherein one of the second furniture parts is pulled out of the first furniture part via a pair of slide rail assemblies.
Figure 2:
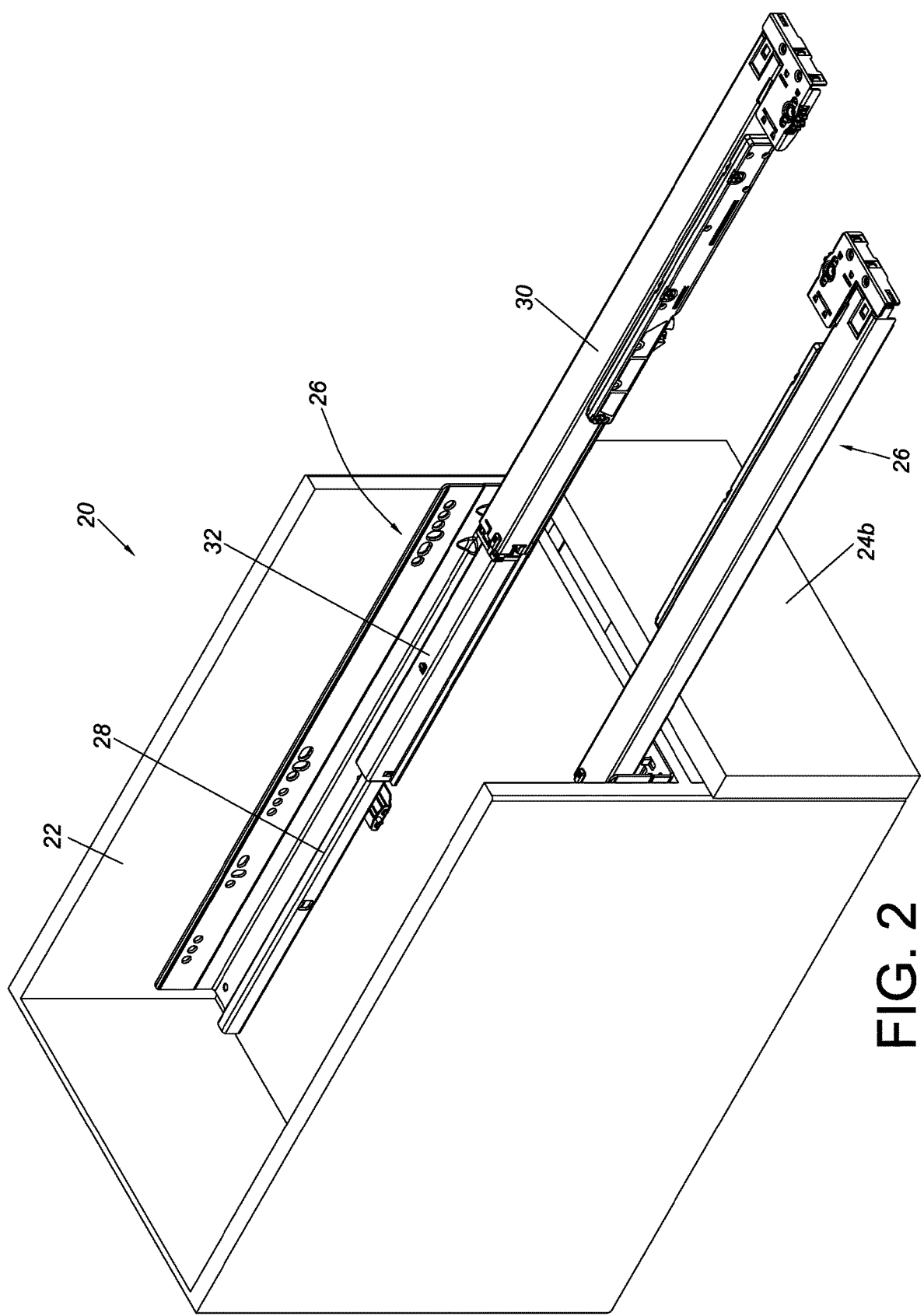
FIG. 2 is similar to FIG. 1 except that one of the second furniture parts is removed.

Referring to FIG. 1 and FIG. 2, a piece of furniture 20 includes a first furniture part 22 and at least one second furniture part (also referred to herein as the furniture part). Here, two second furniture parts 24*a* and 24*b* are provided by way of example. Each second furniture part, such as the second furniture part 24*a*, can be displaced with respect to the first furniture part 22. Preferably, a pair of slide rail assemblies 26 are provided to facilitate displacement of the second furniture part 24*a* with respect to the first furniture part 22. The first furniture part 22 may be the body of a furniture cabinet, and the two second furniture parts 24*a* and 24*b* may be drawers; the present invention has no limitation in this regard. The pair of slide rail assemblies 26 allow the second furniture part 24*a* to be movably mounted on the first furniture part 22. Each slide rail assembly 26 is an under-mount slide rail assembly mounted on the bottom of the second furniture part 24*a* and includes a first rail 28, a second rail 30 (also referred to herein as the slide rail) longitudinally displaceable with respect to the first rail 28, and preferably also a third rail 32 movably mounted between the first rail 28 and the second rail 30 to increase the distance by which the second rail 30 can be displaced with respect to the first rail 28. The first rails 28 are fixedly mounted on the first furniture part 22. The second rails 30 are configured for carrying the second furniture part 24*a* so that the second furniture part 24*a* can be easily displaced from inside the first furniture part 22 to the outside (as shown in FIG. 1) and pushed back into the first furniture part 22 through the second rails 30.

Figure 3:
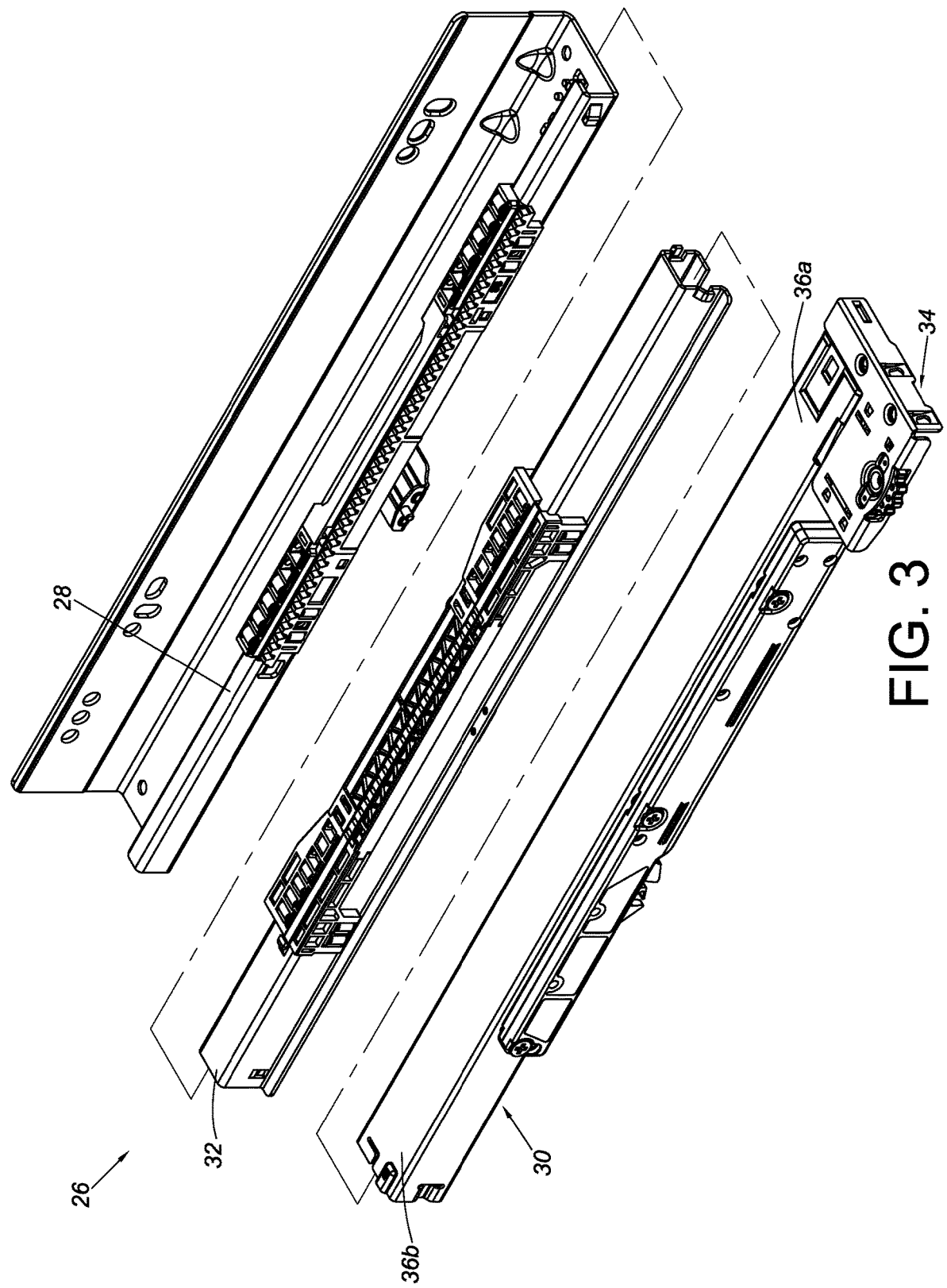
FIG. 3 is an exploded perspective view of one of the slide rail assembly in an embodiment of the present invention.
Figure 4:
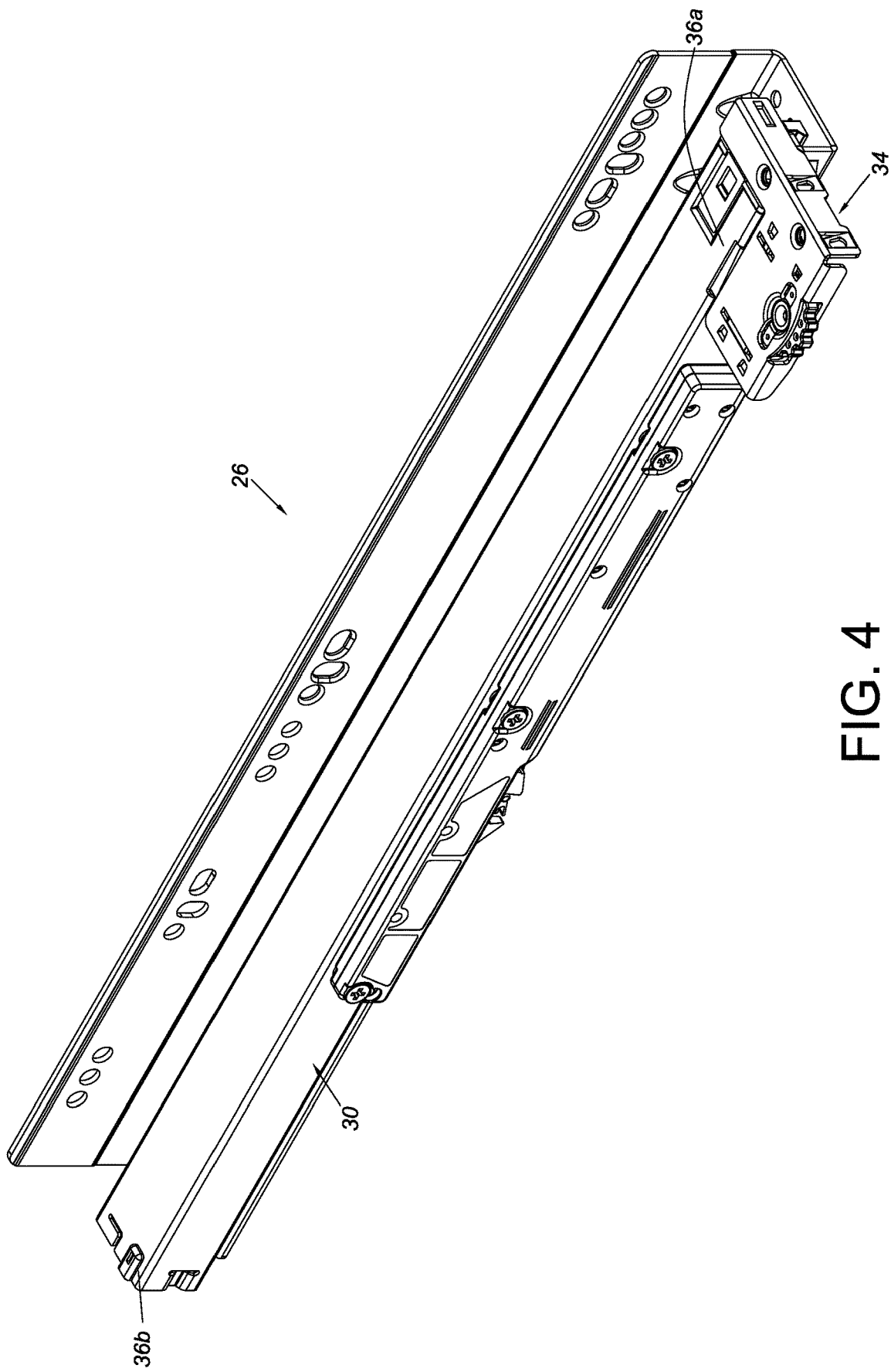
FIG. 4 is an assembled perspective view of the slide rail assembly in an embodiment of the present invention.

Referring to FIG. 3 and FIG. 4, the slide rail assembly 26 includes a coupling mechanism 34 adjacent to the second rail 30. Here, the second rail 30 has a front portion 36*a* and a rear portion 36*b*, and the coupling mechanism 34 is mounted on the second rail 30 at a position adjacent to the front portion 36*a* by way of example.

Figure 5:
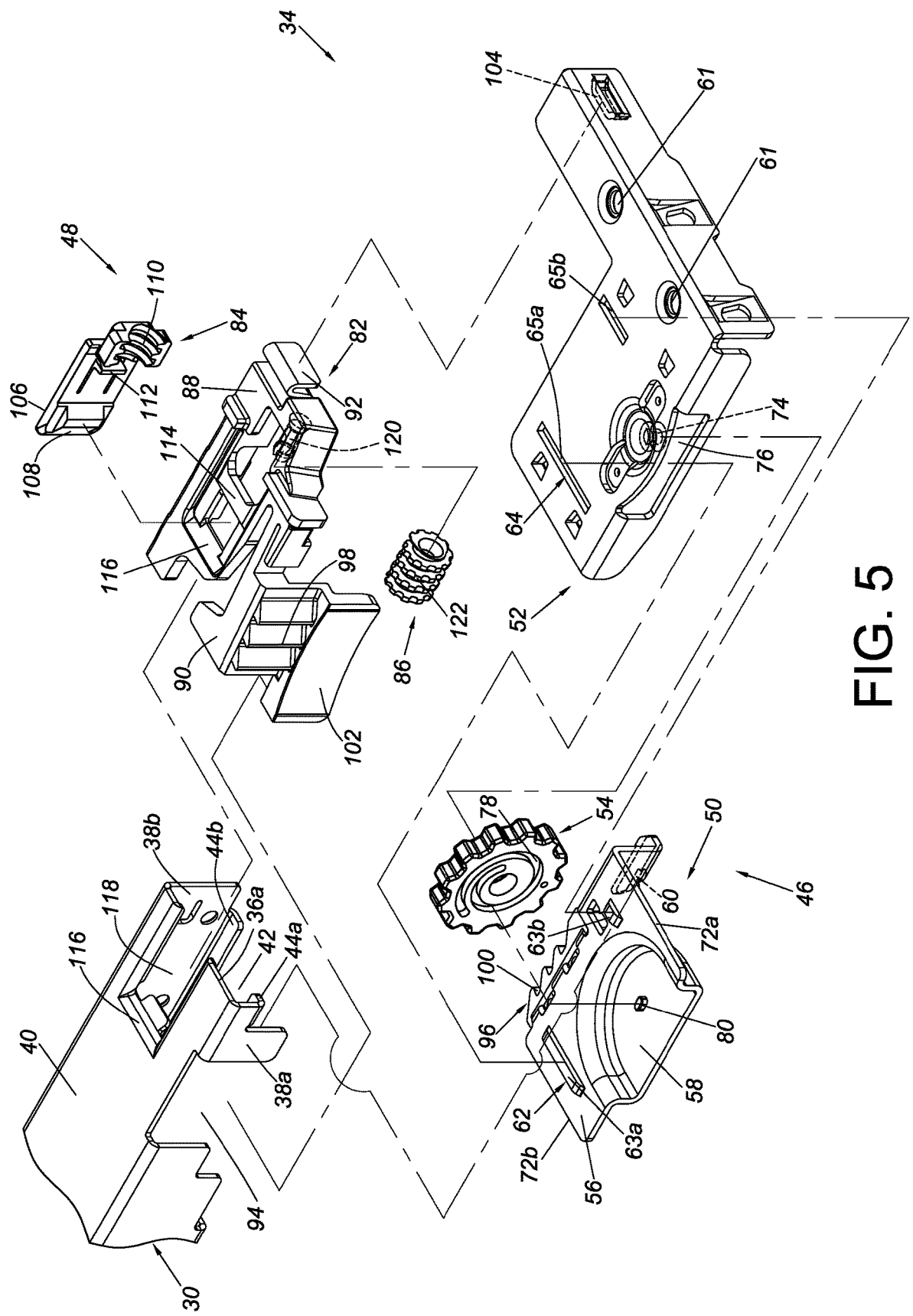
FIG. 5 is an exploded perspective view of the coupling mechanism and the slide rail in an embodiment of the present invention.
Figure 6:
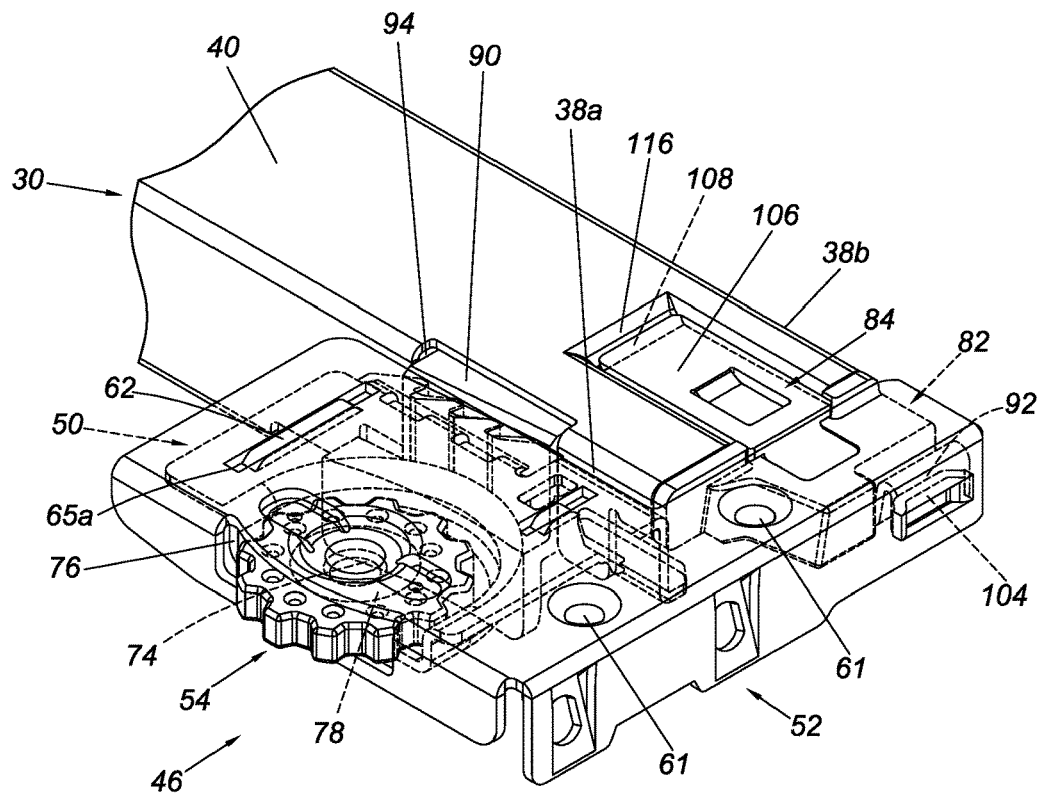
FIG. 6 is an assembled perspective view of the coupling mechanism and the slide rail in an embodiment of the present invention.
Figure 7:
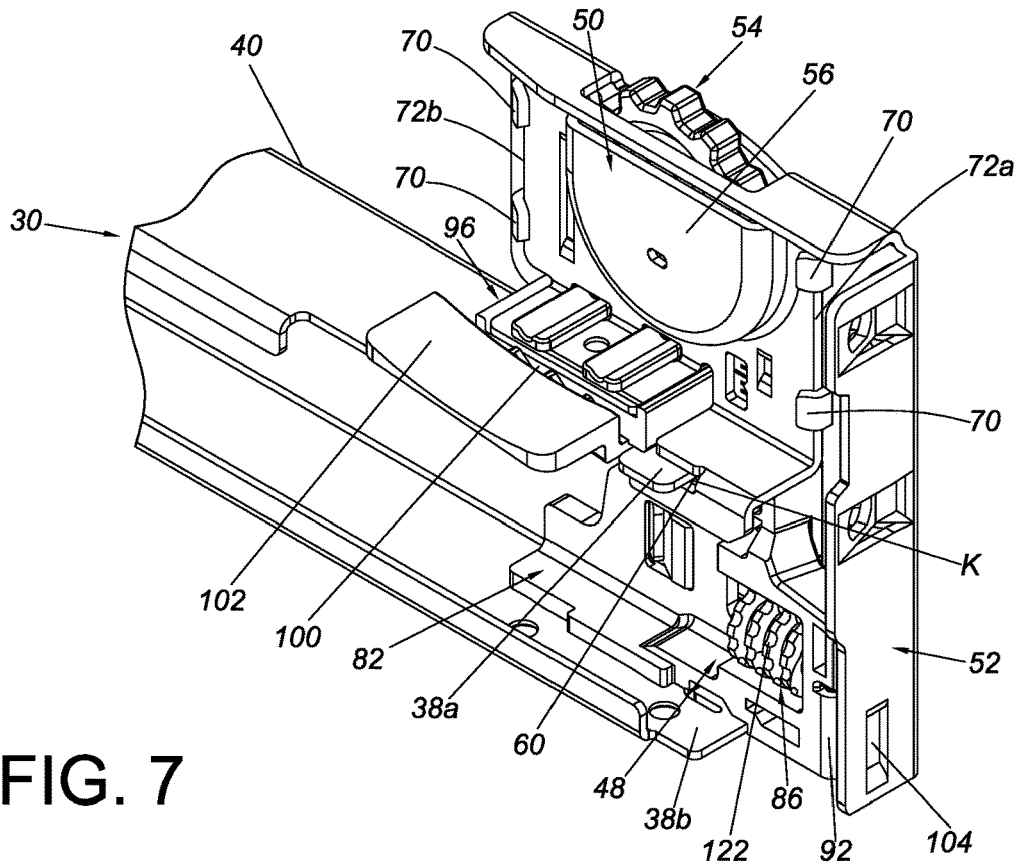
FIG. 7 shows the coupling mechanism and the slide rail in an embodiment of the present invention from another viewing angle.

Referring to FIG. 5, FIG. 6, and FIG. 7, the second rail 30 is longitudinally arranged and includes a first sidewall 38*a*, a second sidewall 38*b*, and a carrying portion 40 located between the first sidewall 38*a* and the second sidewall 38*b*. The first sidewall 38*a*, the second sidewall 38*b*, and the carrying portion 40 jointly define a supporting space 42. The second rail 30 preferably further includes a first extension section 44a and a second extension section 44b which are substantially perpendicularly connected to the first sidewall 38a and the second sidewall 38b respectively. The first extension section 44a and the second extension section 44b are adjacent to the supporting space 42.

The coupling mechanism 34 includes a coupling base 82 and a cushioning structure 92. The cushioning structure 92 is preferably arranged at the coupling base 82.

The coupling base 82 is detachably fixed to the second rail 30 and is in direct contact with the second rail 30. The cushioning structure 92, on the other hand, is in indirect contact with the second rail 30 via the coupling base 82. Preferably, the coupling base 82 is made of a flexible material (e.g., plastic). The coupling base 82 is fixedly mounted on the second rail 30 at a position adjacent to the front portion 36a and preferably includes a main portion 88 and an elastic portion 90 in addition to the cushioning structure 92. The main portion 88 is mounted in the supporting space 42 of the second rail 30, preferably with the first extension section 44a and the second extension section 44b of the second rail 30 providing support for the main portion 88. The elastic portion 90 is connected to and located at a lateral side of the main portion 88 and juts out of the supporting space 42 through a notch 94 of the second rail 30. The cushioning structure 92 is connected to and located at the front side of the main portion 88.

Preferably, the coupling mechanism 34 further includes a supporting member 84 and a height adjustment member 86. The coupling base 82, the supporting member 84, and the height adjustment member 86 constitute a height adjustment device 48.

The supporting member 84 is movably mounted on the coupling base 82 and includes a supporting portion 106. The supporting member 84 preferably also includes a first guiding feature 108 (also referred to herein as the guiding feature), a first threaded structure 110, and a stop portion 112. Preferably, the supporting portion 106, the first guiding feature 108, the first threaded structure 110, and the stop portion 112 are integrally formed, and the first guiding feature 108 and the stop portion 112 are located at a bottom portion of the supporting portion 106. The stop portion 112 lies between the first guiding feature 108 and the first threaded structure 110 and corresponds in position to a position-limiting section 114 of the coupling base 82. Preferably, the second rail 30 and/or the coupling base 82 includes a second guiding feature 116 (also referred to herein as the guiding feature) corresponding to the first guiding feature 108 of the supporting member 84, and the guiding features 108 and 116 are inclined or curved surfaces. Preferably, the carrying portion 40 of the second rail 30 includes an upper notch 118 in communication with the supporting space 42. When the main portion 88 of the coupling base 82 is mounted in the supporting space 42 of the second rail 30, the supporting portion 106 of the supporting member 84 is located in the upper notch 118.

The height adjustment member 86 is configured to adjust, or more particularly displace, the supporting member 84 with respect to the coupling base 82. The height adjustment member 86 is rotatably mounted on one of the coupling base 82 and the supporting member 84. Here, the height adjustment member 86 is rotatably mounted on the coupling base 82. For example, the coupling base 82 includes a shaft portion 120 that is substantially longitudinally arranged for mounting the height adjustment member 86. The height adjustment member 86 includes a second threaded structure 122 corresponding to the first threaded structure 110 of the supporting member 84. Here, the first threaded structure 110 and the second threaded structure 122 are substantially longitudinally arranged.

Preferably, the coupling mechanism 34 further includes a lateral adjustment device 46. The lateral adjustment device 46 includes a first base 50, a second base 52, and a lateral adjustment member 54 and is mounted on the second furniture part 24a in advance.

The first base 50 is detachably engaged with the coupling base 82 and is thereby attached to the second rail 30 (e.g., to a portion of the second rail 30 that is adjacent to the front portion 36a). Preferably, the first base 50 includes a main body 56, a mounting space 58, and a mounting portion 60. The mounting space 58 is located at the main body 56. The mounting portion 60 (e.g., a hook configured to hook to the first sidewall 38a of the second rail 30 in a detachable manner) is located on one side of the main body 56. Preferably, the first base 50 includes an engaging structure 96, and the elastic portion 90 of the coupling base 82 is detachably engaged with the engaging structure 96 of the first base 50. More specifically, the elastic portion 90 includes at least one first engaging section 98, and the engaging structure 96 includes at least one second engaging section 100 corresponding to the first engaging section 98. Preferably, the at least one first engaging section 98 and the at least one second engaging section 100 have serrated contours. Preferably, the coupling base 82 further includes an operating portion 102 extending from the elastic portion 90. The operating portion 102 makes it easier for an operator to press the elastic portion 90 and thereby disengage the first engaging section 98 of the elastic portion 90 from the second engaging section 100 of the first base 50. Or, the operating portion 102 can be operated to bring the first engaging section 98 back into the supporting space 42 so that the coupling base 82 can be removed from the second rail 30.

The second base 52 can be displaced with respect to the first base 50. Preferably, the first base 50 includes at least one first feature 62, and the second base 52 includes at least one second feature 64. The first feature 62 and the second feature 64 are configured to work with each other in order for the second base 52 to be linearly displaceable within a limited range with respect to the first base 50. For example, the first feature 62 includes two differently shaped projections 63a and 63b, and the second feature 64 includes two sub-features that correspond to the two projections 63a and 63b of the first feature 62 respectively. For example, the second feature 64 includes two receiving spaces 65a and 65b for receiving the two projections 63a and 63b respectively. The two receiving spaces 65a and 65b may be slots or long, narrow grooves for example, wherein the slots or long, narrow grooves are substantially transversely arranged and are slightly longer or larger than the two projections 63a and 63b of the first feature 62 respectively so that the second base 52 can be linearly displaced with respect to the first base 50 within a limited range by means of the two projections 63a and 63b and the two receiving spaces 65a and 65b. It is worth mentioning that the structural features of the first feature 62 and the second feature 64 are interchangeable; the present invention has no limitation in this regard, provided that the first base 50 and the second base 52 are movable with respect to each other while connected. Besides, one of the first base 50 and the second base 52 includes at least one guiding structure 70 (see FIG. 7) for guiding the second base 52 in predetermined directions with respect to the first base 50. Here, the second base 52 includes two pairs of guiding structures 70 by way of example. The guiding structures 70 (e.g., protruding blocks) serve to keep two corresponding edges 72a and 72b (e.g., a front edge and a rear edge) of the first base 50 in position. Preferably, the second base 52 includes a contact portion 104 corresponding to the cushioning structure 92. When mounting the second furniture part 24a to the second rail 30, the second furniture part 24 is pressed against the cushioning structure 92 via the contact portion 104 of the second base 52, thereby compensating for a longitudinal gap K that may exist between the first base 50 and the second rail 30. The contact portion 104 and the cushioning structure 92 may swap positions. That is to say, the second base 52 may have the cushioning structure 92 while the coupling base 82 has the contact portion 104; the present invention has no limitation in this regard.

The lateral adjustment member 54 is configured to adjust the second base 52, or more particularly to displace the second base 52 laterally (or transversely), with respect to the longitudinal length of the second rail 30. The lateral adjustment member 54 is rotatably mounted on one of the first base 50 and the second base 52. Here, the lateral adjustment member 54 is rotatably mounted on the second base 52. For example, the second base 52 has a shaft 74, and the lateral adjustment member 54 is rotatably mounted to the second base 52 via the shaft 74. Preferably, the lateral adjustment member 54 is received in the mounting space 58 of the first base 50 and is partially exposed through an aperture 76 of the second base 52 so that an operator can rotate the lateral adjustment member 54 with ease. Preferably, the lateral adjustment member 54 includes an adjusting portion 78, and one of the first base 50 and the second base 52 is equipped with a transmission structure 80 (see FIG. 5). Here, by way of example, it is the first base 50 that is equipped with the transmission structure 80. The transmission structure 80 is configured to work with the adjusting portion 78. The adjusting portion 78 is preferably arranged in a substantially spiral manner.

Figure 8:
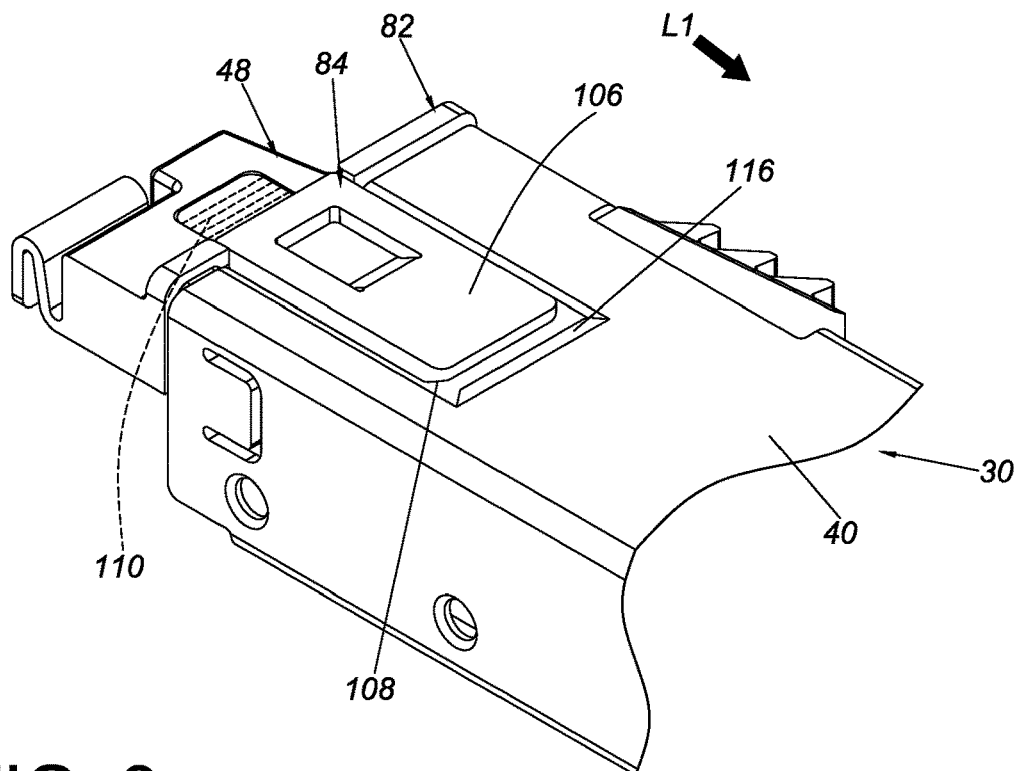
FIG. 8 is an assembled perspective view of the height adjustment device of the coupling mechanism and the slide rail in an embodiment of the present invention, wherein the supporting member of the height adjustment device is not yet adjusted and is at a certain position with respect to the slide rail.
Figure 9:
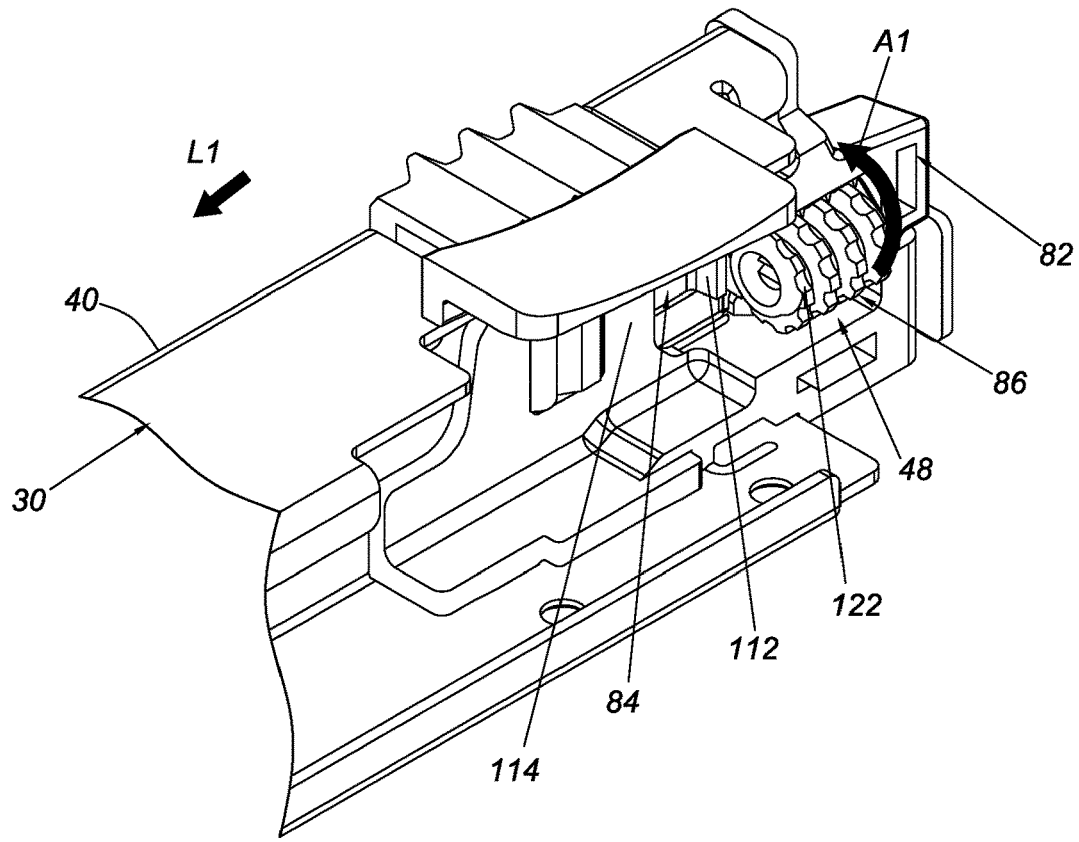
FIG. 9 shows the height adjustment device and the slide rail in an embodiment of the present invention from another viewing angle.
Figure 10:
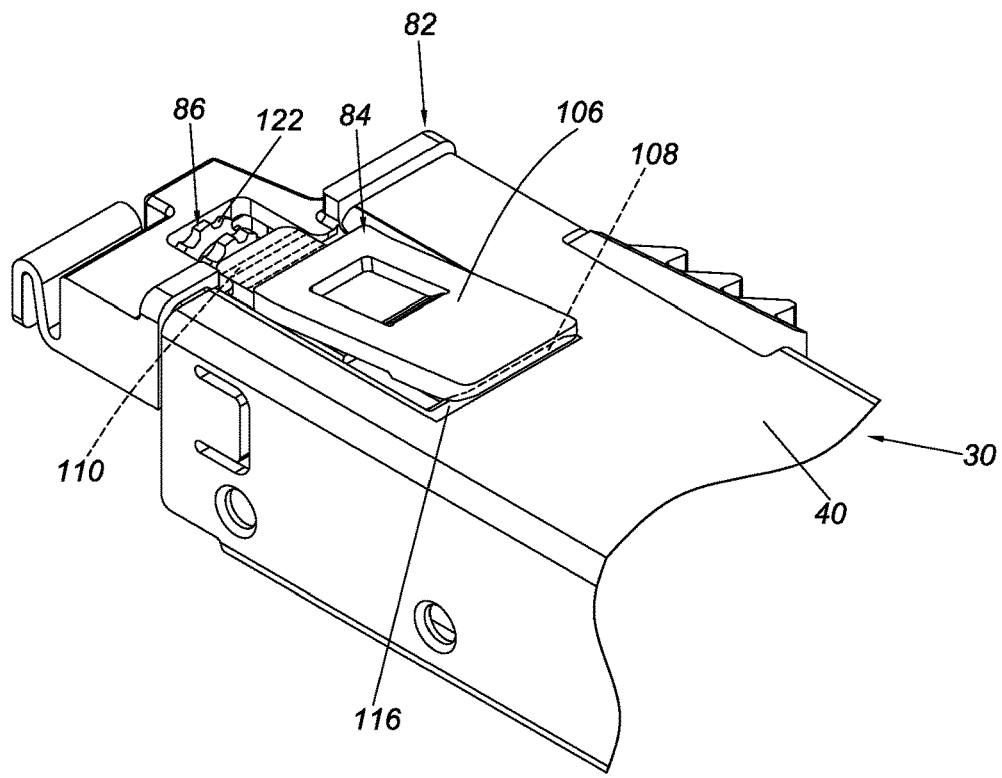
FIG. 10 shows that the supporting member of the height adjustment device is adjusted and therefore at another position with respect to the slide rail in accordance with an embodiment of the present invention.

Referring to FIG. 8, FIG. 9, and FIG. 10, the supporting portion 106 of the supporting member 84 is substantially lower than or as high as the carrying portion 40 of the second rail 30. An operator may rotate the height adjustment member 86 in a first operation direction A1 with respect to the coupling base 82 so that the second threaded structure 122 of the height adjustment member 86 works with the first threaded structure 110 of the supporting member 84 to displace the supporting member 84 with respect to the coupling base 82. Furthermore, the supporting portion 106 of the supporting member 84 will rise from its original position to another position, i.e., be adjusted in height with respect to the carrying portion 40 of the second rail 30, thanks to the first guiding feature 108 and/or the second guiding feature 116.

Figure 11:
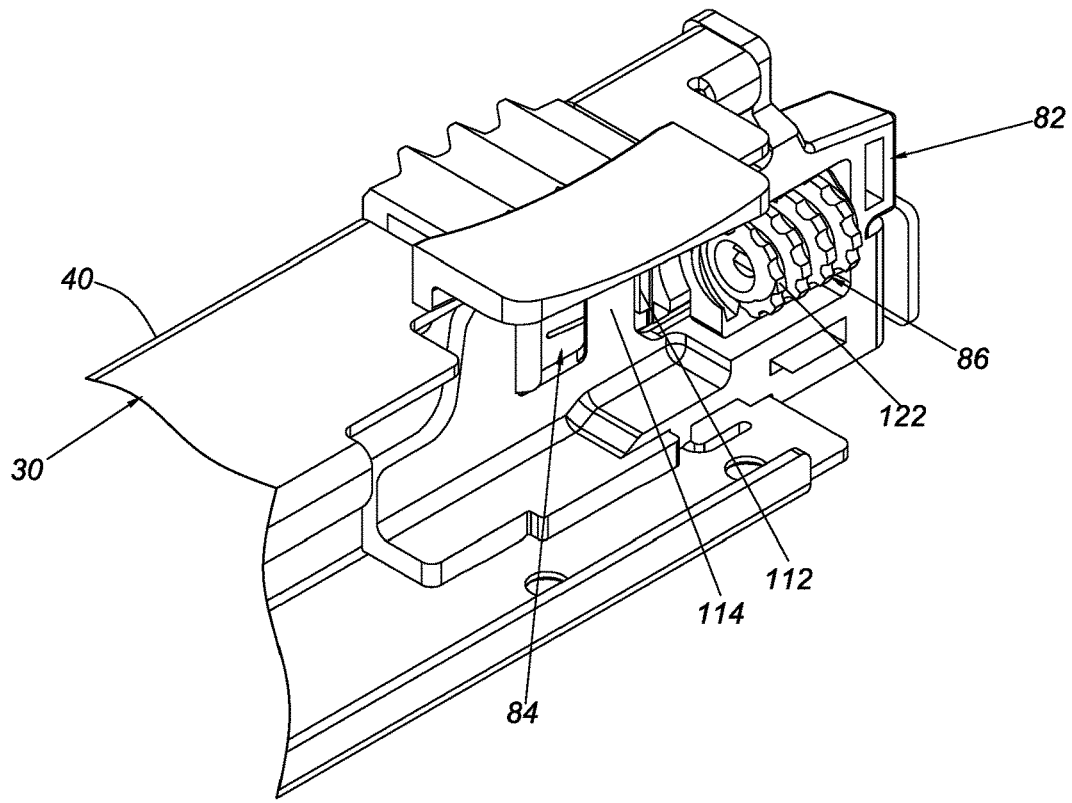
FIG. 11 shows the height adjustment device and the slide rail in FIG. 10 from another viewing angle.

When the operator rotates the height adjustment member 86 in the first operation direction A1, referring to FIG. 9 and FIG. 11, the supporting member 84 is displaced in a first longitudinal direction L1 with respect to the coupling base 82 and/or the second rail 30. Once displaced a predetermined distance in the first longitudinal direction L1, the stop portion 112 of the supporting member 84 is blocked by the position-limiting section 114 of the coupling base 82 to prevent the supporting member 84 from excessive displacement in the first longitudinal direction L1.

It is worth mentioning that the operator may also rotate the height adjustment member 86 in a second operation direction (e.g., the opposite direction of the first operation direction A1), thereby displacing the supporting member 84 in a second longitudinal direction (e.g., the opposite direction of the first longitudinal direction L1) to lower the supporting portion 106 of the supporting member 84 with respect to the carrying portion 40 of the second rail 30.

Figure 12:
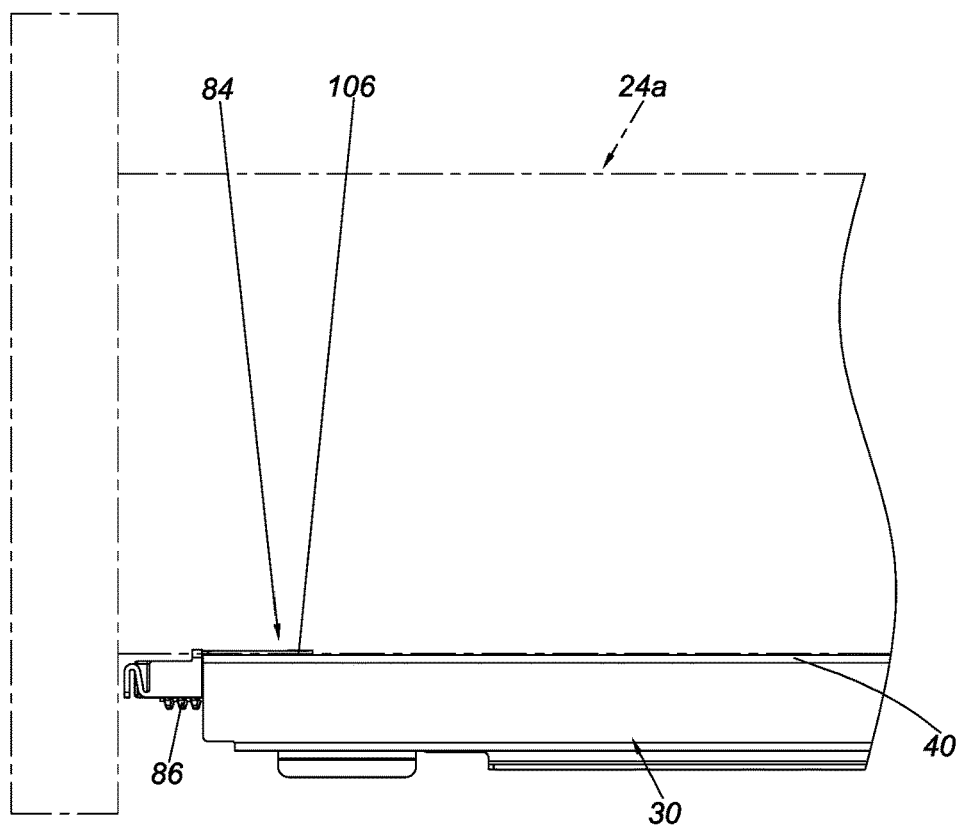
FIG. 12 shows how the slide rail carries the second furniture part in accordance with an embodiment of the present invention.
Figure 13:
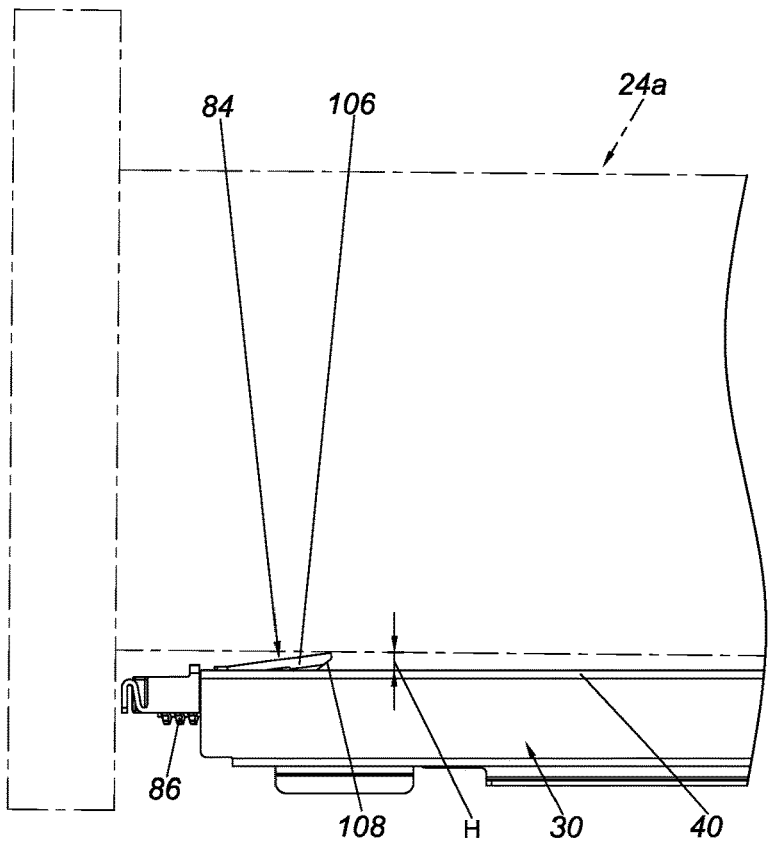
FIG. 13 shows the second furniture part vertically spaced apart from the slide rail after being adjusting through the height adjustment device in accordance with an embodiment of the present invention.

Referring to FIG. 12 and FIG. 13, when the second furniture part 24a is mounted on the second rail 30, the carrying portion 40 of the second rail 30 carries or supports the second furniture part 24a, and the supporting portion 106 of the supporting member 84 faces the second furniture part 24a. By adjusting the height adjustment member 86 (e.g., by rotating it in the first operation direction A1), the supporting portion 106 of the supporting member 84 can be raised with respect to the carrying portion 40 of the second rail 30 by a height H by means of the first guiding feature 108 and/or the second guiding feature 116. That is to say, the supporting member 84 can change the vertical distance H between the second furniture part 24a and the carrying portion 40 of the second rail 30 via the guiding feature 108 or 116, thereby adjusting the front-end height of the second furniture part 24a with respect to the first furniture part 22 in order to correct a front-end mounting error of the second furniture part 24a with respect to the first furniture part 22.

Figure 14:
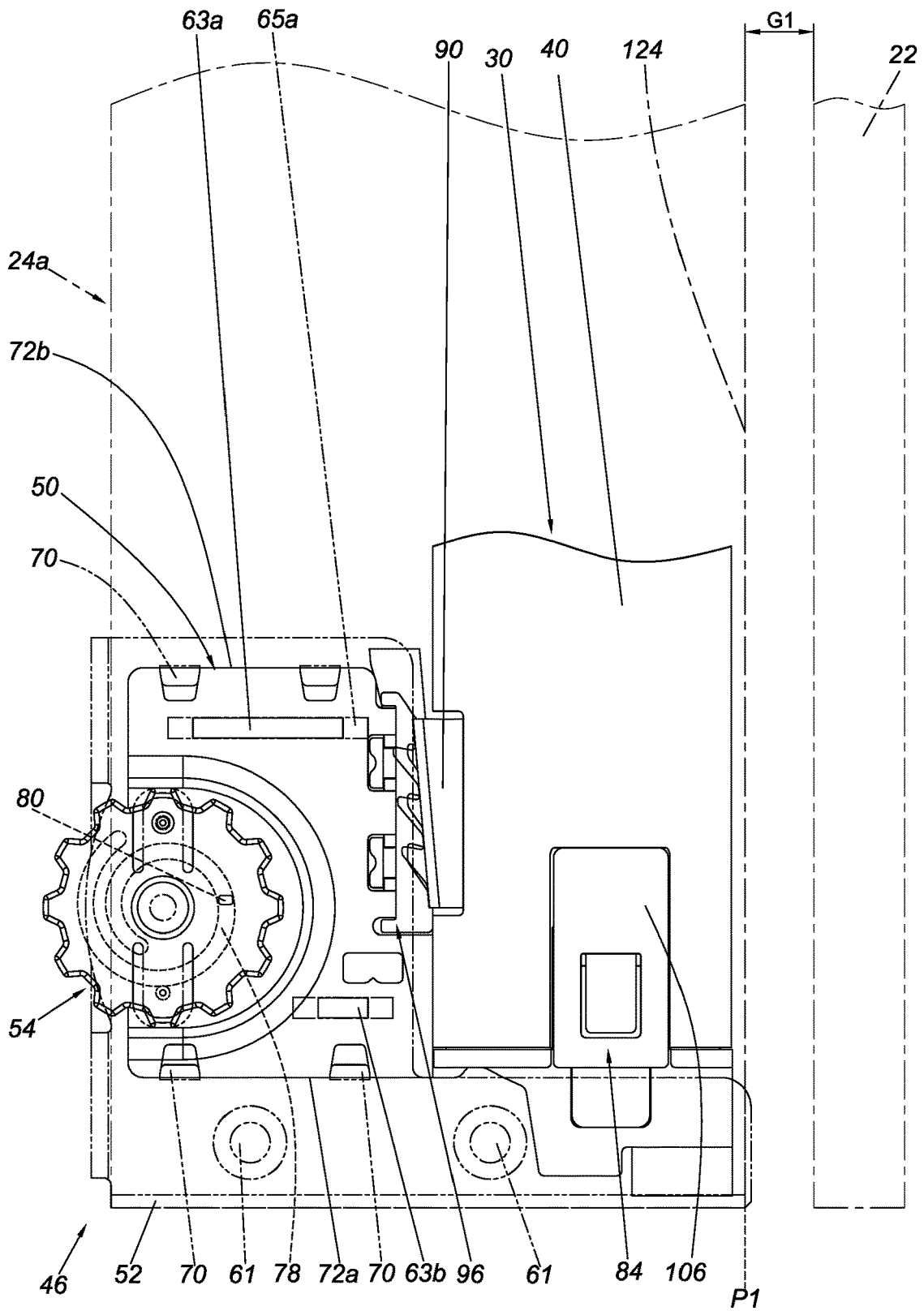
FIG. 14 shows the second furniture part being mounted to the slide rail through the coupling mechanism in accordance with an embodiment of the present invention, with the second furniture part spaced apart from the first furniture part by a first distance.

Referring to FIG. 14, the second base 52 can be fixedly connected (e.g., threadedly connected) to the second furniture part 24a via at least one fixing portion 61 in advance in order to mount the second furniture part 24a to the second rail 30. The carrying portion 40 of the second rail 30 serves to carry the second furniture part 24a. As shown in the drawing, there is a first distance G1 between the lateral side 124 of the second furniture part 24a and the first furniture part 22. The adjusting portion 78 (e.g., a spiral guide groove or guide channel) of the lateral adjustment member 54 can work with the transmission structure 80 (e.g., a projection located in the guide groove or guide channel) to change the first distance G1 as needed. The transmission structure 80 will be pressed against one of the two sidewalls of the guide groove or guide channel when the lateral adjustment member 54 is adjusted.

Figure 15:
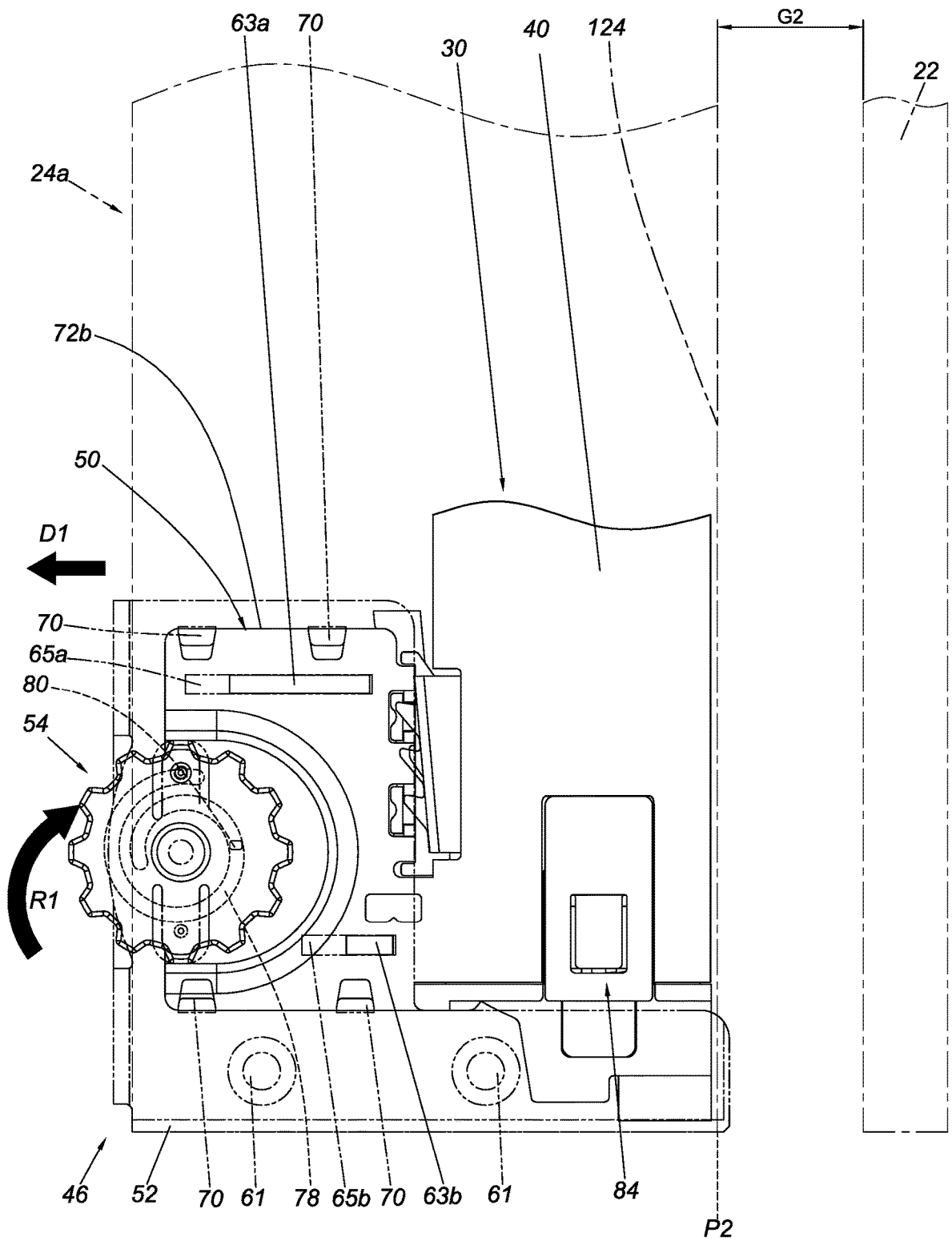
FIG. 15 shows the second furniture part being adjusted, i.e., laterally displaced, by the lateral adjustment device of the coupling mechanism and thereby spaced apart from the first furniture part by a second distance in accordance with an embodiment of the present invention.

When it is desired to laterally adjust the second furniture part 24a, referring to FIG. 15, the operator may adjust the lateral adjustment member 54 in order to displace the second base 52 with respect to the first base 50, thereby changing the lateral position of the second furniture part 24a with respect to the first furniture part 22 or the second rail 30. For example, the operator may rotate the lateral adjustment member 54 in a first rotation direction R1 so that the adjusting portion 78 of the lateral adjustment member 54 works with the transmission structure 80 to displace the second base 52 in a first lateral direction D1 with respect to the second rail 30 or the first base 50, thus moving the second furniture part 24a from a first lateral position P1 (see FIG. 14) to a second lateral position P2 with respect to the second rail 30. Consequently, the first distance G1 between the lateral side 124 of the second furniture part 24a and the first furniture part 22 is changed to a second distance G2, wherein the second distance G2 is larger than the first distance G1.

Figure 16:
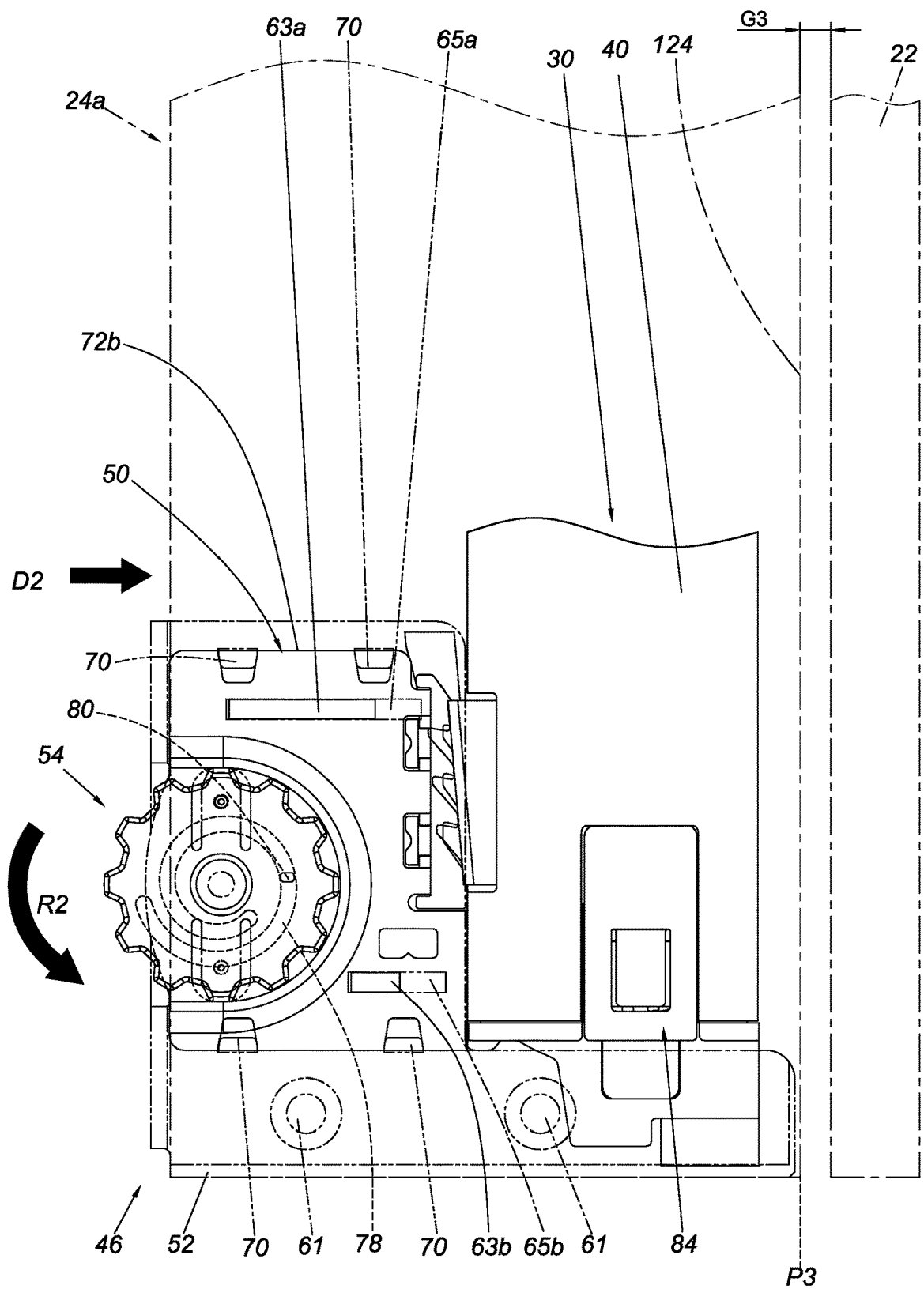
FIG. 16 shows the second furniture part being further adjusted, i.e., laterally displaced, by the lateral adjustment device of the coupling mechanism and thereby spaced apart from the first furniture part by a third distance in accordance with an embodiment of the present invention.

When it is desired to further adjust, or laterally displace, the second furniture part 24a toward the first furniture part 22, referring to FIG. 16, the operator rotates the lateral adjustment member 54 in a second rotation direction R2 so that, with the adjusting portion 78 of the lateral adjustment member 54 working with the transmission structure 80, the second base 52 is displaced in a second lateral direction D2 with respect to the second rail 30 or the first base 50, wherein the second lateral direction D2 is the opposite direction of the first lateral direction D1. As a result, the second furniture part 24a is moved from the second lateral position P2 to a third lateral position P3 with respect to the second rail 30, and the second distance G2 between the lateral side 124 of the second furniture part 24*a* and the first furniture part 22 is changed to a third distance G3, wherein the third distance G3 is smaller than the first distance G1.

It can be known from the above that the transmission structure 80 serves to convert a rotary movement of the lateral adjustment member 54 (or the adjusting portion 78) into a linear displacement or lateral displacement of the second base 52 with respect to the second rail 30 or the first base 50.

Referring to FIG. 17, the carrying portion 40 of the second rail 30 carries or supports the second furniture part 24*a* from below. More specifically, the cushioning structure 92 is mounted, through the main portion 88 of the coupling base 82, to a portion of the second rail 30 that is adjacent to the front portion 36*a*; in other words, the cushioning structure 92 is in indirect contact with the second rail 30. Preferably, the cushioning structure 92 includes at least one winding contour 126, and the winding contour 126 in this embodiment is substantially composed of at least one U-shaped or V-shaped section. The second base 52, which is fixedly connected to the second furniture part 24*a* in advance, can be viewed as a part of the second furniture part 24*a*, and the contact portion 104 of the second base 52 corresponds in position to the cushioning structure 92. The cushioning structure 92 has a predetermined longitudinal length X1.

Once the second furniture part 24*a* is mounted on the second rail 30, referring to FIG. 18, a gap within mounting tolerances may exist between the second furniture part 24*a* and the second rail 30. The gap, if present, may allow relative displacement, and hence interference in the form of collision, between the second furniture part 24*a* and the second rail 30. For example, a gap within mounting tolerances may allow the second furniture part 24*a* to be displaced longitudinally (e.g., in the first longitudinal direction L1) with respect to the second rail 30 when subjected to an external force, and during such displacement, the second furniture part 24*a* will push the cushioning structure 92 through the contact portion 104 of the second base 52 such that the cushioning structure 92 is compressed and consequently changed from the predetermined longitudinal length X1 (see FIG. 17) to a compressed longitudinal length X2, wherein the compressed longitudinal length X2 is smaller than the predetermined longitudinal length X1.

Referring to FIG. 19 and FIG. 20, the longitudinal gap K may exist between the second furniture part 24*a* (or the second base 52) and the second rail 30 because of mounting tolerances. Here, the longitudinal gap K is formed between the mounting portion 60 of the first base 50 and the first sidewall 38*a* of the second rail 30 by way of example.

Referring to FIG. 19 and FIG. 21, when the second furniture part 24*a* is displaced in the first longitudinal direction L1 with respect to the second rail 30, the contact portion 104 of the second base 52 pushes the cushioning structure 92 and thereby brings the mounting portion 60 of the first base 50 closer to the first sidewall 38*a* of the second rail 30 in the first longitudinal direction L1, reducing the longitudinal gap K (see FIG. 20) to a longitudinal gap K1 (see FIG. 22). It can be known from the above that the cushioning structure 92 can compensate for a possible longitudinal gap K between the first base 50 and the second rail 30, allowing the second furniture part 24*a* mounted on the second rail 30 to be displaced stably without being interfered.

The slide rail assembly 26 and/or the coupling mechanism 34 of the present invention preferably has the following features:

1. The lateral adjustment device 46 can be used to adjust the lateral position of the second furniture part 24*a* with respect to a slide rail (e.g., the second rail 30) or the first furniture part 22.
2. The height adjustment device 48 can be used to adjust the height of the second furniture part 24*a* with respect to a slide rail (e.g., the second rail 30).
3. The lateral adjustment device 46 and the height adjustment device 48 are detachably fixed to a slide rail (e.g., the second rail 30).
4. The contact portion 104 of the second base 52 is pressed against the cushioning structure 92 of the coupling base 82 to compensate for a longitudinal gap K that may exist between the first base 50 and the second rail 30 once the second furniture part 24*a* is mounted to the second rail 30.
5. The coupling base 82 of the height adjustment device 48 is mounted on a slide rail (e.g., the second rail 30), includes the elastic portion 90, and is detachably engaged with the first base 50.

While the present invention has been disclosed through the preferred embodiment described above, it should be understood that the embodiment is not intended to be restrictive of the scope of the invention. The scope of patent protection sought by the applicant is defined by the appended claims.

What is claimed is:
1. A coupling mechanism adapted for a furniture part and a slide rail, the coupling mechanism comprising:
   a first base, the first base being configured for detachably engaging the slide rail;
   a second base displaceably connected to the first base and being adapted for attachment to the slide rail, the second base further being adapted for attachment with the furniture part;
   a coupling base detachably coupled to the first base, the coupling base including a main portion configured to slidably engage the slide rail along a longitudinal direction, and an elastic portion extending transversely from the main portion relative to the longitudinal direction, the elastic portion being configured for releasably locked coupling with the first base, the elastic portion having an engaging section formed with a serrated contour and the first base having an engaging structure formed with a serrated contour corresponding to the serrated contour of the engaging section, the serrated contour of the engaging section projecting transversely from the elastic portion relative to the longitudinal direction; and
   a cushioning structure deflectively captured between the second base and the coupling base, the cushioning structure having a winding contour extending longitudinally from the coupling base and being deflected between the second and coupling bases to elastically maintain contact therebetween in correspondence with a change in a gap between the first base and the slide rail.

2. The coupling mechanism of claim 1, wherein the cushioning structure has a predetermined initial length compressible according to the gap.

3. The coupling mechanism of claim 1, further comprising a supporting member and a height adjustment member, wherein the supporting member includes a supporting portion adapted for contacting the furniture part, and the height adjustment member is configured for displacing and thereby adjusting the supporting member with respect to the coupling base to change a height of the supporting portion of the supporting member with respect to the coupling base through a guiding feature.

4. The coupling mechanism of claim 3, wherein the guiding feature includes one of an inclined surface and a curved surface.

5. The coupling mechanism of claim 3, wherein the height adjustment member is rotatably mounted on the coupling base, and the height adjustment member and the supporting member have corresponding threaded structures.

6. The coupling mechanism of claim 1, further comprising: a lateral adjustment member rotatably mounted on one of the first base and the second base, wherein the lateral adjustment member is configured for displacing and thereby adjusting the second base with respect to the first base in order to change a lateral position of the furniture part with respect to the slide rail; and a transmission structure for converting a rotary movement of the lateral adjustment member into a linear displacement of the second base with respect to the first base.

7. The coupling mechanism of claim 6, wherein the first base includes a first feature, the second base includes a second feature, one of the first feature and the second feature includes at least one projection, the other of the first feature and the second feature includes at least one receiving space for receiving the at least one projection, and the at least one receiving space is larger than the at least one projection so that, with the first feature and the second feature working with each other, the second base is displaceable within a limited range with respect to the first base.

8. The coupling mechanism of claim 6, wherein the lateral adjustment member is rotatably mounted on the second base and includes an adjusting portion, the transmission structure is located at the first base, and the transmission structure and the adjusting portion are configured to work with each other.

9. The coupling mechanism of claim 8, wherein the adjusting portion is a substantially spiral guide groove, and the transmission structure is a projection located in the guide groove.

\* \* \* \* \*